United States Patent
Xu et al.

(10) Patent No.: US 12,113,972 B2
(45) Date of Patent: Oct. 8, 2024

(54) ADAPTIVE RESOLUTION CHANGE AND SCALABLE CODING FOR SCREEN CONTENTS

(71) Applicants: Beijing Bytedance Network Technology Co., Ltd., Beijing (CN); Bytedance Inc., Los Angeles, CA (US)

(72) Inventors: Jizheng Xu, San Diego, CA (US); Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 102 days.

(21) Appl. No.: 17/698,114

(22) Filed: Mar. 18, 2022

(65) Prior Publication Data
US 2022/0217341 A1 Jul. 7, 2022

Related U.S. Application Data

(63) Continuation of application No. PCT/CN2020/116473, filed on Sep. 21, 2020.

(30) Foreign Application Priority Data

Sep. 20, 2019 (WO) ................ PCT/CN2019/106984

(51) Int. Cl.
*H04N 19/117* (2014.01)
*H04N 19/105* (2014.01)
(Continued)

(52) U.S. Cl.
CPC ......... *H04N 19/117* (2014.11); *H04N 19/105* (2014.11); *H04N 19/12* (2014.11); *H04N 19/167* (2014.11); *H04N 19/172* (2014.11)

(58) Field of Classification Search
CPC .... H04N 19/176; H04N 19/186; H04N 19/00; H04N 19/103; H04N 19/105;
(Continued)

(56) References Cited

U.S. PATENT DOCUMENTS 6,804,403 B1  10/2004  Wang et al.
9,712,833 B2   7/2017  Wang et al.
(Continued)

FOREIGN PATENT DOCUMENTS

EP    3541078 A1 * 9/2019 ............. H04N 19/57
WO   2015055111 A1   4/2015
(Continued)

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.
(Continued)

*Primary Examiner* — Christopher S Kelley
*Assistant Examiner* — Asmamaw G Tarko
(74) *Attorney, Agent, or Firm* — Perkins Coie LLP

(57) ABSTRACT

Adaptive resolution change and scalable coding for screen contents are described. One example is a method for video processing, comprising: determining, for a conversion between a picture or a video and a bitstream representation of the picture or the video, whether the picture or the video is native resolution based on an indication included in the bitstream representation; and performing the conversion based on the determination.

16 Claims, 11 Drawing Sheets

(51) Int. Cl.
*H04N 19/12* (2014.01)
*H04N 19/167* (2014.01)
*H04N 19/172* (2014.01)

(58) Field of Classification Search
CPC .. H04N 19/107; H04N 19/117; H04N 19/136; H04N 19/593
USPC .................................................. 375/240.12
See application file for complete search history.

(56) References Cited

U.S. PATENT DOCUMENTS

| | | | |
|---|---|---|---|
| 9,860,559 B2 | 1/2018 | Zhang et al. | |
| 9,877,043 B2 | 1/2018 | He et al. | |
| 9,973,751 B2 | 5/2018 | He et al. | |
| 10,178,403 B2 | 1/2019 | Seregin et al. | |
| 10,284,874 B2 | 5/2019 | He et al. | |
| 10,412,387 B2 | 9/2019 | Pang et al. | |
| 10,455,231 B2 | 10/2019 | Xu et al. | |
| 10,516,882 B2 | 12/2019 | He et al. | |
| 10,582,213 B2 | 3/2020 | Li et al. | |
| 10,582,227 B2 | 3/2020 | He et al. | |
| 10,785,483 B2 * | 9/2020 | Kim | H04N 19/182 |
| 10,880,547 B2 | 12/2020 | Xu et al. | |
| 10,986,349 B2 * | 4/2021 | Zhou | H04N 19/103 |
| 2006/0256863 A1 | 11/2006 | Wang et al. | |
| 2007/0058713 A1 | 3/2007 | Shen et al. | |
| 2015/0016516 A1 * | 1/2015 | Saxena | H04N 19/593 375/240.12 |
| 2016/0080751 A1 * | 3/2016 | Xiu | H04N 19/157 375/240.02 |
| 2016/0198154 A1 * | 7/2016 | Hsiang | H04N 19/70 375/240.03 |
| 2016/0337661 A1 * | 11/2016 | Pang | H04N 19/523 |
| 2017/0214913 A1 * | 7/2017 | Zhang | H04N 19/176 |
| 2017/0289566 A1 | 10/2017 | He et al. | |
| 2017/0302966 A1 * | 10/2017 | Xu | H04N 19/196 |
| 2018/0014017 A1 * | 1/2018 | Li | H04N 19/127 |
| 2018/0098087 A1 * | 4/2018 | Li | H04N 19/132 |
| 2019/0200038 A1 | 6/2019 | He et al. | |
| 2019/0246143 A1 | 8/2019 | Zhang et al. | |
| 2019/0297339 A1 * | 9/2019 | Hannuksela | H04N 19/105 |
| 2019/0320181 A1 * | 10/2019 | Chen | H04N 19/137 |
| 2019/0373261 A1 * | 12/2019 | Egilmez | H04N 19/96 |
| 2020/0077087 A1 | 3/2020 | He et al. | |
| 2020/0169751 A1 * | 5/2020 | Thomas | H04N 19/39 |
| 2020/0169768 A1 | 5/2020 | He et al. | |
| 2020/0344469 A1 * | 10/2020 | Coban | H04N 19/70 |
| 2020/0396465 A1 | 12/2020 | Zhang et al. | |
| 2020/0404255 A1 | 12/2020 | Zhang et al. | |
| 2020/0404260 A1 | 12/2020 | Zhang et al. | |
| 2020/0413048 A1 | 12/2020 | Zhang et al. | |
| 2020/0413053 A1 * | 12/2020 | Esenlik | H04N 19/463 |
| 2021/0051341 A1 * | 2/2021 | Seregin | H04N 19/70 |
| 2021/0250580 A1 * | 8/2021 | Chen | H04N 19/105 |

FOREIGN PATENT DOCUMENTS

| | | |
|---|---|---|
| WO | 2017129568 A1 | 8/2017 |
| WO | 2018175720 A1 | 9/2018 |

OTHER PUBLICATIONS

Chen et al. "AHG8: Integrated Specification Text for Reference Picture Resampling," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O1164, 2019.
https://vcgit.hhi.fraunhofer.de/jvet/VVCSoftware_VTM/tags/VTM-6.0.
International Search Report and Written Opinion from PCT/CN2020/116473 dated Dec. 21, 2020 (13 pages).

* cited by examiner

FIG. 4

ADAPTIVE RESOLUTION CHANGE AND SCALABLE CODING FOR SCREEN CONTENTS

CROSS-REFERENCE TO RELATED APPLICATION

This application is a continuation of International Application No. PCT/CN2020/116473, filed on Sep. 21, 2020, which claims the priority to and benefits of International Patent Application No. PCT/CN2019/106984, filed on Sep. 20, 2019. All the aforementioned applications are incorporated by reference as part of the disclosure of this application.

TECHNICAL FIELD

This patent document relates to video and image coding and decoding.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to video and image coding and decoding in which scalable video coding is implemented.

In one example aspect, a method of video processing is disclosed. The method includes performing a conversion between a video at a native resolution and a coded representation of the video at a coded resolution, wherein a field in the coded representation is indicative of a relationship between the native resolution and the coded resolution.

In another example aspect, a method of video processing is disclosed. The method includes determining, for a conversion between a video segment of a video and a coded representation of the video, applicability of screen content coding for the conversion of the video segment based on a usage rule associated with usage of a coding mode for blocks in the video segment; and performing the conversion based on the determining.

In another example aspect, a method of video processing is disclosed. The method includes determining, for a conversion between a video unit of a video and a coded representation of the video using a screen content coding tool, a property of the conversion due to a reference picture and a current picture comprising the video unit being of different sizes; and performing the conversion based on the determining.

In another example aspect, a method of video processing is disclosed. The method includes determining, for a conversion between a video unit of a video and a scalable coded representation of the video, a constraint rule used for the conversion; and performing the conversion according to the constraint rule; wherein the scalable coded representation includes a first layer and a second layer wherein the first layer has a quality less than a quality of the second layer.

In another example aspect, a method of video processing is disclosed. The method includes determining, for a conversion between a video and a coded representation of the video using a lossless coding mode, that the coded representation omits syntax elements related to signaling of quantization parameters or a coded block flag; and performing the conversion based on the determining.

In another example aspect, a method of video processing is disclosed. The method includes determining, for a conversion between a picture or a video and a bitstream representation of the picture or the video, whether the picture or the video is native resolution based on an indication included in the bitstream representation; and performing the conversion based on the determination.

In another example aspect, a method of video processing is disclosed. The method includes determining, for a conversion between a picture or a video and a bitstream representation of the picture or the video, whether the picture or the video is screen content based on an usage of one or more certain coding tools or a signaled message; and performing the conversion based on the determination.

In another example aspect, a method of video processing is disclosed. The method includes determining, for a conversion between a picture or a video and a scalable coded bitstream representation of the picture or the video, one or more constrains associated with scalable video coding of the picture or the video; and performing the conversion based on the determination.

In another example aspect, a method of video processing is disclosed. The method includes determining, for a conversion between a picture or a video and a bitstream representation of the picture or the video, one or more syntaxes are skipped when the conversion uses a lossless coding mode; and performing the conversion based on the determination.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

In yet another representative aspect, a computer program product stored on a non-transitory computer readable media including program code may implement a method as described herein.

The above and other aspects and features of the disclosed technology are described in greater detail in the drawings, the description and the claims.

BRIEF DESCRIPTION OF THE DRAWINGS

FIG. 4 shows examples of horizontal and vertical traverse scans.

DETAILED DESCRIPTION

Figure 1:
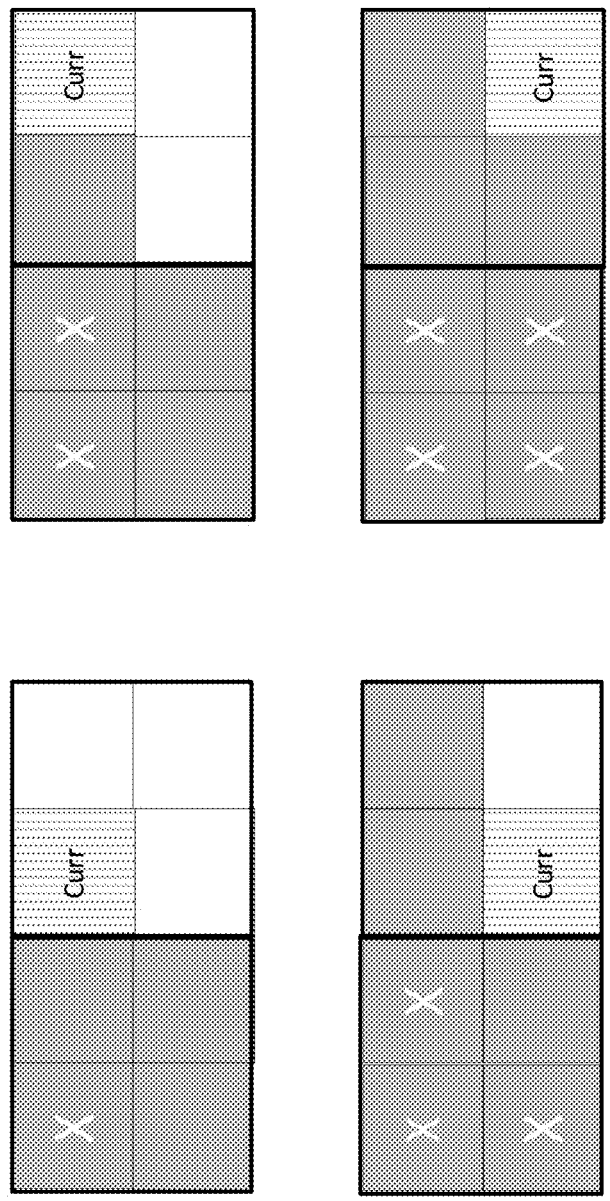
FIG. 1 shows an example of a current CTU processing order and its available reference samples in current and left CTU.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1 SUMMARY

This document is related to video coding technologies. Specifically, it is related to various technologies for reference picture resampling (or adaptive resolution change) and scalable video coding for screen content coding. It may be applied to the existing video coding standard like HEVC, or the standard (Versatile Video Coding) to be finalized. It may be also applicable to future video coding standards or video codec.

2 INITIAL DISCUSSION

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards [1]. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Screen Content Coding Tools 2.1.1 Intra Block Copy (IBC)

Intra block copy (IBC) is a tool adopted in HEVC extensions on SCC. It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 subblocks. For the current block of a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs.

At CU level, IBC mode is signalled with a flag and it can be signaled as IBC AMVP mode or IBC skip/merge mode as follows:

IBC skip/merge mode: a merge candidate index is used to indicate which of the block vectors in the list from neighboring candidate IBC coded blocks is used to predict the current block. The merge list consists of spatial, HMVP, and pairwise candidates.

IBC AMVP mode: block vector difference is coded in the same way as a motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

2.1.1.1 IBC Reference Region

To reduce memory consumption and decoder complexity, the IBC in VTM6 allows only the reconstructed portion of the predefined area including the region of current CTU and some region of the left CTU. FIG. 1 illustrates the reference region of IBC Mode, where each block represents 64×64 luma sample unit.

Depending on the location of the current coding CU location within the current CTU, the following applies:

If current block falls into the top-left 64×64 block of the current CTU, then in addition to the already reconstructed samples in the current CTU, it can also refer to the reference samples in the bottom-right 64×64 blocks of the left CTU, using CPR mode. The current block can also refer to the reference samples in the bottom-left 64×64 block of the left CTU and the reference samples in the top-right 64×64 block of the left CTU, using CPR mode.

If current block falls into the top-right 64×64 block of the current CTU, then in addition to the already reconstructed samples in the current CTU, if luma location (0, 64) relative to the current CTU has not yet been reconstructed, the current block can also refer to the reference samples in the bottom-left 64×64 block and bottom-right 64×64 block of the left CTU, using CPR mode; otherwise, the current block can also refer to reference samples in bottom-right 64×64 block of the left CTU.

If current block falls into the bottom-left 64×64 block of the current CTU, then in addition to the already reconstructed samples in the current CTU, if luma location (64, 0) relative to the current CTU has not yet been reconstructed, the current block can also refer to the reference samples in the top-right 64×64 block and bottom-right 64×64 block of the left CTU, using CPR mode. Otherwise, the current block can also refer to the reference samples in the bottom-right 64×64 block of the left CTU, using CPR mode.

If current block falls into the bottom-right 64×64 block of the current CTU, it can only refer to the already reconstructed samples in the current CTU, using CPR mode.

This restriction allows the IBC mode to be implemented using local on-chip memory for hardware implementations.

2.1.1.2 IBC Interaction with Other Coding Tools

The interaction between IBC mode and other inter coding tools in VTM6, such as pairwise merge candidate, history based motion vector predictor (HMVP), combined intra/inter prediction mode (CIIP), merge mode with motion vector difference (MMVD), and triangle partition are as follows:

IBC can be used with pairwise merge candidate and HMVP. A new pairwise IBC merge candidate can be generated by averaging two IBC merge candidates. For HMVP, IBC motion is inserted into history buffer for future referencing.

IBC cannot be used in combination with the following inter tools: affine motion, CIIP, MMVD, and triangle partition.

IBC is not allowed for the chroma coding blocks when DUAL_TREE partition is used.

Unlike in the HEVC screen content coding extension, the current picture is no longer included as one of the reference pictures in the reference picture list 0 for IBC prediction. The derivation process of motion vectors for IBC mode excludes all neighboring blocks in inter mode and vice versa. The following IBC design aspects are applied:

IBC shares the same process as in regular MV merge including with pairwise merge candidate and history based motion predictor, but disallows TMVP and zero vector because they are invalid for IBC mode.

Separate HMVP buffer (5 candidates each) is used for conventional MV and IBC.

Block vector constraints are implemented in the form of bitstream conformance constraint, the encoder needs to ensure that no invalid vectors are present in the bitstream, and merge shall not be used if the merge candidate is invalid (out of range or 0). Such bitstream conformance constraint is expressed in terms of a virtual buffer as described below.

For deblocking, IBC is handled as inter mode.

If the current block is coded using IBC prediction mode, AMVR does not use quarter-pel; instead, AMVR is signaled to only indicate whether MV is inter-pel or 4 integer-pel.

The number of IBC merge candidates can be signalled in the slice header separately from the numbers of regular, subblock, and triangle merge candidates.

A virtual buffer concept is used to describe the allowable reference region for IBC prediction mode and valid block vectors. Denote CTU size as ctbSize, the virtual buffer, ibcBuf, has width being wIbcBuf=128*128/ctbSize and height hIbcBuf=ctbSize. For example, for a CTU size of 128×128, the size of ibcBuf is also 128×128; for a CTU size of 64×64, the size of ibcBuf is 256×64; and a CTU size of 32×32, the size of ibcBuf is 512×32.

The size of a VPDU is min(ctbSize, 64) in each dimension, $W_v$=min(ctbSize, 64).

The virtual IBC buffer, ibcBuf is maintained as follows.
1) At the beginning of decoding each CTU row, refresh the whole ibcBuf with an invalid value −1.
2) At the beginning of decoding a VPDU (xVPDU, yVPDU) relative to the top-left corner of the picture, set the ibcBuf[x][y]=−1, with x=xVPDU % wIbcBuf, . . . , xVPDU % wIbcBuf+$W_v$−1; y=yVPDU % ctbSize, . . . , yVPDU % ctbSize+$W_v$−1.
3) After decoding a CU contains (x, y) relative to the top-left corner of the picture, set ibcBuf[x % wIbcBuf][y % ctbSize]=recSample[x][y]

For a block covering the coordinates (x, y), if the following is true for a block vector bv=(bv[0], bv[1]), then it is valid; otherwise, it is not valid:

$$ibcBuf[(x + bv[0])\%wIbcBuf][(y + bv[1])\%ctbSize]$$

shall not be equal to −1.

2.1.2 Block Differential Pulse Coded Modulation (BDPCM)

VTM6 supports block differential pulse coded modulation (BBDPCM) for screen content coding. At the sequence level, a BDPCM enable flag is signalled in the SPS; this flag is signalled only if the transform skip mode (described in the next section) is enabled in the SPS.

When BDPCM is enabled, a flag is transmitted at the CU level if the CU size is smaller than or equal to MaxTsSize by MaxTsSize in terms of luma samples and if the CU is intra coded, where MaxTsSize is the maximum block size for which the transform skip mode is allowed. This flag indicates whether regular intra coding or BDPCM is used. If BDPCM is used, a BDPCM prediction direction flag is transmitted to indicate whether the prediction is horizontal or vertical. Then, the block is predicted using the regular horizontal or vertical intra prediction process with unfiltered reference samples. The residual is quantized and the difference between each quantized residual and its predictor, i.e. the previously coded residual of the horizontal or vertical (depending on the BDPCM prediction direction) neighbouring position, is coded.

For a block of size M (height)×N (width), let $r_{i,j}$, $0 \le i \le M-1$, $0 \le j \le N-1$ be the prediction residual. Let $Q(r_{i,j})$, $0 \le i \le M-1$, $0 \le j \le N-1$ denote the quantized version of the residual $r_{i,j}$. BDPCM is applied to the quantized residual values, resulting in a modified M×N array $\tilde{R}$ with elements $\tilde{r}_{i,j}$, where $\tilde{r}_{i,j}$ is predicted from its neighboring quantized residual value. For vertical BDPCM prediction mode, for $0 \le j \le (N-1)$, the following is used to derive $\tilde{r}_{i,j}$:

$$\tilde{r}_{i,j} = \begin{cases} Q(r_{i,j}), & i = 0 \\ Q(r_{i,j}) - Q(r_{(i-1),j}), & 1 \le i \le (M-1) \end{cases}$$

For horizontal BDPCM prediction mode, for $0 \le i \le (M-1)$, the following is used to derive $\tilde{r}_{i,j}$:

$$\tilde{r}_{i,j} = \begin{cases} Q(r_{i,j}), & j = 0 \\ Q(r_{i,j}) - Q(r_{i,(j-1)}), & 1 \le j \le (N-1) \end{cases}$$

At the decoder side, the above process is reversed to compute $Q(r_{i,j})$, $0 \leq i \leq M-1$, $0 \leq j \leq N-1$, as follows:

$$Q(r_{i,j}) = \sum_{k=0}^{i} \tilde{r}_{k,j}, \text{ if vertical } BDPCM \text{ is used}$$

$$Q(r_{i,j}) = \sum_{k=0}^{j} \tilde{r}_{i,k}, \text{ if horizontal } BDPCM \text{ is used}$$

The inverse quantized residuals, $Q^{-1}$ ($Q(r_{i,j})$), are added to the intra block prediction values to produce the reconstructed sample values.

The predicted quantized residual values $\tilde{r}_{i,j}$ are sent to the decoder using the same residual coding process as that in transform skip mode residual coding. In terms of the MPM mode for future intra mode coding, horizontal or vertical prediction mode is stored for a BDPCM-coded CU if the BDPCM prediction direction is horizontal or vertical, respectively. For deblocking, if both blocks on the sides of a block boundary are coded using BDPCM, then that particular block boundary is not deblocked.

2.1.3 Residual Coding for Transform Skip Mode

Figure 2:
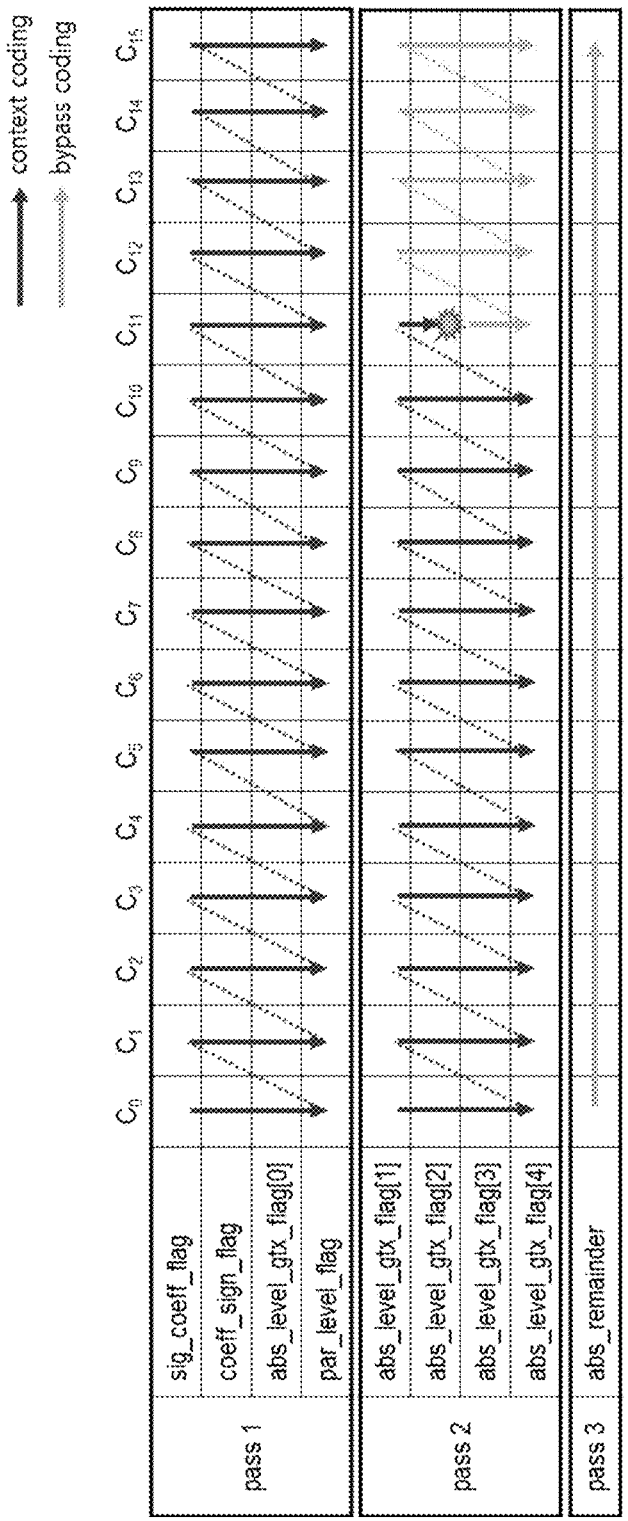
FIG. 2 shows an example of residual coding passes for transform skip blocks.

VTM6 allows the transform skip mode to be used for luma blocks of size up to MaxTsSize by MaxTsSize, where the value of MaxTsSize is signaled in the PPS and can be at most 32 in VTM6. When a CU is coded in transform skip mode, its prediction residual is quantized and coded using the transform skip residual coding process. This process is modified from the transform coefficient coding process. In transform skip mode, the residuals of a TU are also coded in units of non-overlapped subblocks of size 4×4. For better coding efficiency, some modifications are made to customize the residual coding process towards the residual signal's characteristics. The following summarizes the differences between transform skip residual coding and regular transform residual coding in VTM6:

Forward scanning order is applied to scan the subblocks within a transform block and also the positions within a subblock;

no signalling of the last (x, y) position;

coded_sub_block_flag is coded for every subblock except for the last subblock when all previous flags are equal to 0;

sig_coeff_flag context modelling uses a reduced template, and context model of sig_coeff_flag depends on top and left neighbouring values;

context model of abs_level_gt1 flag also depends on the left and top sig_coeff_flag context modelling uses a reduced template, and context model of sig_coeff_flag depends on top and left neighbouring values;

values.

par_level_flag using only one context model;

additional greater than 3, 5, 7, 9 flags are signalled to indicate the coefficient level, one context for each flag;

modified rice parameter derivation for the binarization of the remainder values;

context model of the sign flag is determined based on left and above neighbouring values and the sign flag is parsed after sig_coeff_flag to keep all context coded bins together;

For each subblock, if the coded_subblock_flag is equal to 1 (i.e., there is at least one non-zero quantized residual in the subblock), coding of the quantized residual levels is performed in three scan passes (see FIG. 2).

First scan pass: significance flag (sig_coeff_flag), sign flag (coeff_sign_flag), absolute level greater than 1 flag (abs_level_gtx_flag[0]), and parity (par_level_flag) are coded. For a given scan position, if sig_coeff_flag is equal to 1, then coeff_sign_flag is coded, followed by the abs_level_gtx_flag[0] (which specifies whether the absolute level is greater than 1). If abs_level_gtx_flag[0] is equal to 1, then the par_level_flag is additionally coded to specify the parity of the absolute level.

Greater than x scan pass: for each scan position whose absolute level is greater than 1, up to four abs_level_gtx_flag[i] for i=1 . . . 4 are coded to indicate if the absolute level at the given position is greater than 3, 5, 7, or 9, respectively.

Remainder scan pass: The remainder of the absolute level are coded for all scan positions with abs_level_gtx_flag[4] equal to 1 (that is, the absolute level is greater than 9). The remainder of the absolute levels are binarized using reduced rice parameter derivation template.

The bins in scan passes #1 and #2 (the first scan pass and the greater than x scan pass) are context coded until the maximum number of context coded bins in the TU have been exhausted. The maximum number of context coded bins in a residual block is limited to 2*block_width*block_height, or equivalently, 2 context coded bins per sample position on average. The bins in the last scan pass (the remainder scan pass) are bypass coded.

FIG. 2 shows an example of residual coding passes for transform skip blocks.

Further, for a block not coded in the BDPCM mode, a level mapping mechanism is applied to transform skip residual coding. Level mapping uses the top and left neighbouring coefficient levels to predict the current coefficient level in order to reduce signalling cost. For a given residual position, denote absCoeff as the absolute coefficient level before mapping and absCoeffMod as the coefficient level after mapping. Let Xo denote the absolute coefficient level of the left neighbouring position and let Xi denote the absolute coefficient level of the above neighbouring position. The level mapping is performed as follows:

```
pred = max(X0, X1);
if (absCoeff == pred)
    absCoeffMod = 1;
else
    absCoeffMod = (absCoeff < pred) ? absCoeff + 1 : absCoeff;
```

Then, the absCoeffMod value is coded as described above.

2.1.4 Palette Mode

VTM6 supports the palette mode to be used for screen content coding in 4:4:4 color format. When palette mode is enabled, a flag is transmitted at the CU level if the CU size is smaller than or equal to 64×64 indicating whether palette mode is used. A palette coded coding unit (CU) is treated as a prediction mode other than intra prediction, inter prediction, and intra block copy (IBC) mode.

Figure 3:
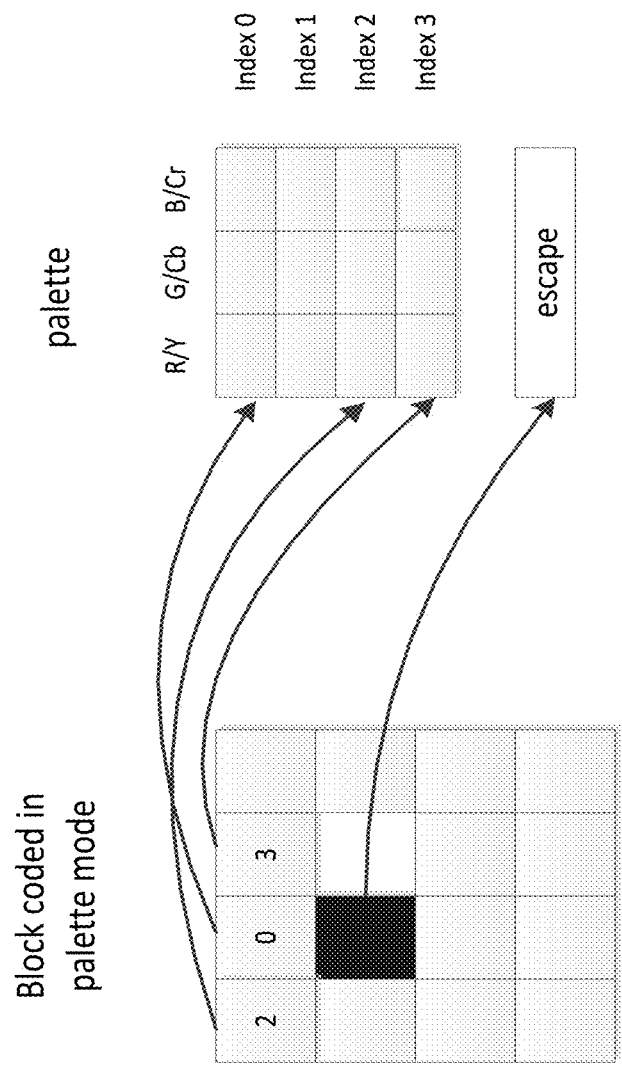
FIG. 3 shows an example of a block coded in palette mode.

If the palette mode is utilized, the sample values in the CU are represented by a small set of representative colour values. The set is referred to as the palette. For pixels with values close to the palette colors, the palette indices are signalled. It is also possible to specify a sample that is outside the palette by signalling an escape symbol followed by quantized component values. This is illustrated in FIG. 3.

For coding of the palette, a palette predictor is maintained. The predictor is initialized to 0 at the beginning of each slice for non-wavefront case and at the beginning of each CTU row for wavefront case. For each entry in the palette predictor, a reuse flag is signalled to indicate whether it is part of the current palette in the CU. The reuse flags are sent using run-length coding of zeros. After this, the number of new palette entries and the component values for the new palette entries are signalled. After encoding the palette coded CU, the palette predictor will be updated using the current palette, and entries from the previous palette predictor that are not reused in the current palette will be added at the end of the new palette predictor until the maximum size allowed is reached. An escape flag is signaled for each CU to indicate if escape symbols are present in the current CU. If escape symbols are present, the palette table is augmented by one and the last index is assigned to be the escape symbol.

Figure 4:
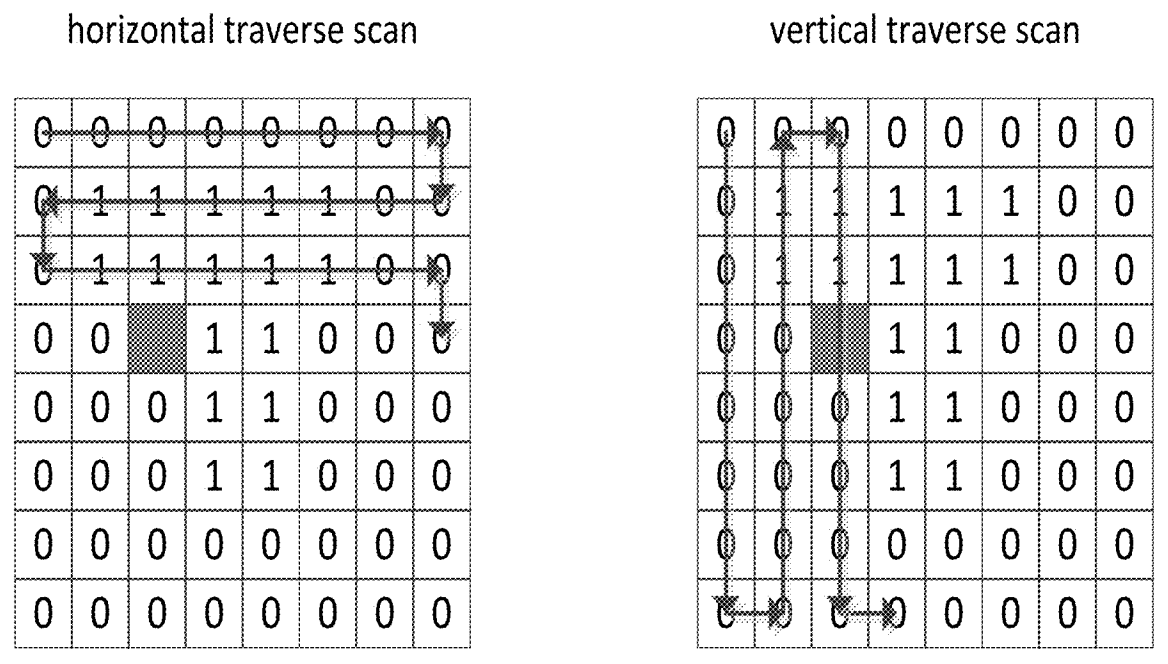

Palette indices of samples in a CU form a palette index map. The index map is coded using horizontal and vertical traverse scans as shown in FIG. 4. The scan order is explicitly signalled in the bitstream using the palette_transpose_flag.

The palette indices are coded using two main palette sample modes: 'INDEX' and 'COPY_ABOVE'. The mode is signalled using a flag except for the top row when horizontal scan is used, the first column when the vertical scan is used, or when the previous mode was 'COPY_ABOVE'. In the 'COPY_ABOVE' mode, the palette index of the sample in the row above is copied. In the 'INDEX' mode, the palette index is explicitly signalled. For both 'INDEX' and 'COPY_ABOVE' modes, a run value is signalled which specifies the number pixels that are coded using the same mode.

The encoding order for index map is as follows: First, the number of index values associated to 'INDEX' runs is signalled. This is followed by signalling of the actual index values associated to 'INDEX' runs for the entire CU using truncated binary coding. Then the palette mode (INDEX or COPY_ABOVE) and run length for each run are signalled in an interleaved manner. Finally, the quantized escape mode colors for the entire CU are grouped together and coded with exponential Golomb coding.

For slices with dual luma/chroma tree, palette is applied on luma (Y component) and chroma (Cb and Cr components) separately. For slices of single tree, palette will be applied on Y, Cb, Cr components jointly, i.e., each entry in the palette contains Y, Cb, Cr values.

For deblocking, the palette coded block on the sides of a block boundary is not deblocked.

2.2 Reference Picture Resampling in VVC

VVC draft 6 adopted a reference picture resampling (or adaptive resolution change) design. It allows that the reference picture and the current picture have different resolutions. It contains the following aspects:
 max picture size signaling in SPS,
 actual picture size and conformance window signalling moved to PPS,
 scaling ratio is defined based on the output picture size after cropping,
 resampling is done on a block basis using existed interpolation filters,
 TMVP is used only when current and collocated pictures have the same size,
 DMVR and BDOF are used only when current and reference pictures, selected in a CU for inter prediction, have the same size.

2.2.1 High Level Syntax to Support Reference Picture Resampling

In VVC draft 6, within a sequence, different picture parameter set may contain parameters to define different picture size, and a conformance window to indicate output region, as following.

pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When subpics_present_flag is equal to 1, the value of pic_width_in_luma_samples shall be equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When subpics_present_flag is equal to 1, the value of pic_height_in_luma_samples shall be equal to pic_height_max_in_luma_samples.

Let refPicWidthInLumaSamples and refPicHeightInLumaSamples be the pic_width_in_luma_samples and pic_height_in_luma_samples, respectively, of a reference picture of a current picture referring to this PPS. Is a requirement of bitstream conformance that all of the following conditions are satisfied:
 pic_width_in_luma_samples*2 shall be greater than or equal to refPicWidthInLumaSamples.
 pic_height_in_luma_samples*2 shall be greater than or equal to refPicHeightInLumaSamples.
 pic_width_in_luma_samples shall be less than or equal to refPicWidthInLumaSamples*8.
 pic_height_in_luma_samples shall be less than or equal to refPicHeightInLumaSamples*8.

The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$PicWidthInCtbsY = \text{Ceil}(pic\_width\_in\_luma\_samples \div CtbSizeY) \quad (7\text{-}34)$$

$$PicHeightInCtbsY = \text{Ceil}(pic\_height\_in\_luma\_samples \div CtbSizeY) \quad (7\text{-}35)$$

$$PicSizeInCtbsY = PicWidthInCtbsY * PicHeightInCtbsY \quad (7\text{-}36)$$

$$PicWidthInMinCbsY = pic\_width\_in\_luma\_samples / MinCbSizeY \quad (7\text{-}37)$$

$$PicHeightInMinCbsY = pic\_height\_in\_luma\_samples / MinCbSizeY \quad (7\text{-}38)$$

$$PicSizeInMinCbsY = PicWidthInMinCbsY * PicHeightInMinCbsY \quad (7\text{-}39)$$

$$PicSizeInSamplesY = pic\_width\_in\_luma\_samples * pic\_height\_in\_luma\_samples \quad (7\text{-}40)$$

$$PicWidthInSamplesC = pic\_width\_in\_luma\_samples / SubWidthC \quad (7\text{-}41)$$

$$PicHeightInSamplesC = pic\_height\_in\_luma\_samples / SubHeightC \quad (7\text{-}42)$$

conformance_window_flag equal to 1 indicates that the conformance cropping window offset parameters follow next in the SPS. conformance_window_flag equal to 0 indicates that the conformance cropping window offset parameters are not present.

conf_win_left_offset, conf_win_right_offset, conf_win_top_offset, and conf_win_bottom_offset specify the samples of the pictures in the CVS that are output from the decoding process, in terms of a rectangular region specified in picture coordinates for output. When conformance_window_flag is equal to 0, the values of conf_win_left_offset, conf_win_right_offset, conf_win_top_offset, and conf_win_bottom_offset are inferred to be equal to 0.

The conformance cropping window contains the luma samples with horizontal picture coordinates from SubWidthC*conf_win_left_offset to pic_width_in_luma_samples−(SubWidthC*conf_win_right_offset+1) and vertical picture coordinates from SubHeightC*conf_win_top_offset to pic_height_in_luma_samples−(SubHeightC*conf_win_bottom_offset+1), inclusive.

The value of SubWidthC*(conf_win_left_offset+conf_win_right_offset) shall be less than pic_width_in_luma_samples, and the value of SubHeightC*(conf_win_top_offset+conf_win_bottom_offset) shall be less than pic_height_in_luma_samples.

The variables PicOutputWidthL and PicOutputHeightL are derived as follows:

$$PicOutputWidthL = pic\_width\_in\_luma\_samples - \quad (7\text{-}43)$$
$$SubWidthC * (conf\_win\_right\_offset + conf\_win\_left\_offset)$$

$$PicOutputHeightL = pic\_height\_in\_pic\_size\_units - \quad (7\text{-}44)$$
$$SubHeightC * (conf\_win\_bottom\_offset + conf\_win\_top\_offset)$$

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output. All internal decoding processes are applied to the uncropped picture size.

Let ppsA and ppsB be any two PPSs referring to the same SPS. It is a requirement of bitstream conformance that, when ppsA and ppsB have the same the values of pic_width_in_luma_samples and pic_height_in_luma_samples, respectively, ppsA and ppsB shall have the same values of conf_win_left_offset, conf_win_right_offset, conf_win_top_offset, and conf_win_bottom_offset, respectively.

2.2.2 Fractional Motion Compensation to Deal with Different Resolutions

In VVC draft 6, the fractional motion compensation process can deal with different resolutions. The detailed specification is as follows.

8.5.6.3 Fractional Sample Interpolation Process
8.5.6.3.1 General
Inputs to this process are:
  a luma location (xSb, ySb) specifying the top-left sample of the current coding subblock relative to the top-left luma sample of the current picture,
  a variable sbWidth specifying the width of the current coding subblock,
  a variable sbHeight specifying the height of the current coding subblock,
  a motion vector offset mvOffset,
  a refined motion vector refMvLX,
  the selected reference picture sample array refPicLX,
  the half sample interpolation filter index hpelIfIdx,
  the bi-directional optical flow flag bdofFlag,
  a variable cIdx specifying the colour component index of the current block.

Outputs of this process are:
  an (sbWidth+brdExtSize)×(sbHeight+brdExtSize) array predSamplesLX of prediction sample values.

The prediction block border extension size brdExtSize is derived as follows:

$$brdExtSize = (bdofFlag \,||\, (inter\_affine\_flag[xSb][ySb] \,\&\&\ \quad (8\text{-}752)$$
$$sps\_affine\_prof\_enabled\_flag)) ? 2 : 0$$

The variable fRefWidth is set equal to the PicOutputWidthL of the reference picture in luma samples.

The variable fRefHeight is set equal to PicOutputHeightL of the reference picture in luma samples.

The motion vector mvLX is set equal to (refMvLX−mvOffset).

If cIdx is equal to 0, the following applies:
    The scaling factors and their fixed-point representations are defined as $$hori\_scale\_fp = ((fRefWidth << 14) + (PicOutputWidthL >> 1))\,/ \quad (8\text{-}753)$$
$$PicOutputWidthL$$

$$vert\_scale\_fp = ((fRefHeight << 14) + (PicOutputHeightL >> 1))\,/ \quad (8\text{-}754)$$
$$PicOutputHeightL$$

Let (xIntL, yIntL) be a luma location given in full-sample units and (xFracL, yFracL) be an offset given in 1/16-sample units. These variables are used only in this clause for specifying fractional-sample locations inside the reference sample arrays refPicLX.
    The top-left coordinate of the bounding block for reference sample padding (xSbInt$_L$, ySbInt$_L$) is set equal to (xSb+(mvLX[0]>>4), ySb+(mvLX[1]>>4)).
    For each luma sample location (x$_L$=0 . . . sbWidth−1+brdExtSize, y$_L$=0 . . . sbHeight−1+brdExtSize) inside the prediction luma sample array predSamplesLX, the corresponding prediction luma sample value predSamplesLX[x$_L$][y$_L$] is derived as follows:
      Let (refxSb$_L$, refySb$_L$) and (refx$_L$, refy$_L$) be luma locations pointed to by a motion vector (refMvLX[0], refMvLX[1]) given in 1/16-sample units. The variables refxSb$_L$, refx$_L$, refySb$_L$, and refy$_L$ are derived as follows:

$$refxSb_L = ((xSb << 4) + refMvLX[0]) * hori\_scale\_fp \quad (8\text{-}755)$$

$$refx_L = ((Sign(refxSb) * ((Abs(refxSb) + 128) >> 8) + \quad (8\text{-}756)$$
$$x_L * ((hori\_scale\_fp + 8) >> 4)) + 32) >> 6$$

$$refySb_L = ((ySb << 4) + refMvLX[1]) * vert\_scale\_fp \quad (8\text{-}757)$$

$$refyL = ((Sign(refySb) * ((Abs(refySb) + 128) >> 8) + \quad (8\text{-}758)$$
$$yL * ((vert\_scale\_fp + 8) >> 4)) + 32) >> 6$$

The variables $xInt_L$, $yInt_L$, $xFrac_L$ and $yFrac_L$ are derived as follows:

$$xInt_L = refx_L >> 4 \quad (8\text{-}759)$$

$$yInt_L = refy_L >> 4 \quad (8\text{-}760)$$

$$xFrac_L = refx_L \ \& \ 15 \quad (8\text{-}761)$$

$$yFrac_L = refy_L \ \& \ 15 \quad (8\text{-}762)$$

If bdofFlag is equal to TRUE or (sps_affine_prof_enabled_flag is equal to TRUE and inter_affine_flag [xSb][ySb] is equal to TRUE), and one or more of the following conditions are true, the prediction luma sample value predSamplesLX[$x_L$][$y_L$] is derived by invoking the luma integer sample fetching process as specified in clause 8.5.6.3.3 with (xInt$_L$+(xFrac$_L$>>3)−1), yInt$_L$+(yFrac$_L$>>3)−1) and refPicLX as inputs.
1. $x_L$ is equal to 0.
2. $x_L$ is equal to sbWidth+1.
3. $y_L$ is equal to 0.
4. $y_L$ is equal to sbHeight+1.

Otherwise, the prediction luma sample value predSamplesLX[$x_L$][$y_L$] is derived by invoking the luma sample 8-tap interpolation filtering process as specified in clause 8.5.6.3.2 with (xIntL−(brdExtSize>0?1:0), yIntL−(brdExtSize>0?1:0)), (xFracL, yFracL), (xSbInt$_L$, ySbInt$_L$), refPicLX, hpelIfIdx, sbWidth, sbHeight and (xSb, ySb) as inputs.

Otherwise (cIdx is not equal to 0), the following applies:
Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.

The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).

For each chroma sample location (xC=0 ... sbWidth−1, yC=0 ... sbHeight−1) inside the prediction chroma sample arrays predSamplesLX, the corresponding prediction chroma sample value predSamplesLX[xC][yC] is derived as follows:
Let (refxSb$_C$, refySb$_C$) and (refx$_C$, refy$_C$) be chroma locations pointed to by a motion vector (mvLX[0], mvLX[1]) given in 1/32-sample units. The variables refxSb$_C$, refySb$_C$, refx$_C$ and refy$_C$ are derived as follows:

$$refxSb_C = ((xSb \, / \, SubWidthC << 5) + mvLX[0]) * hori\_scale\_fp \quad (8\text{-}763)$$

$$refx_C = ((Sign(refxSb_C) * ((Abs(refxSb_C) + 256) >> 9) + \\ xC * ((hori\_scale\_fp + 8) >> 4)) + 16) >> 5 \quad (8\text{-}764)$$

$$refySb_C = ((ySb \, / \, SubHeightC << 5) + mvLX[1]) * vert\_scale\_fp \quad (8\text{-}765)$$

$$refy_C = ((Sign(refySb_C) * ((Abs(refySb_C) + 256) >> 9) + \\ yC * ((vert\_scale\_fp + 8) >> 4)) + 16) >> 5 \quad (8\text{-}766)$$

The variables $xInt_C$, $yInt_C$, $xFrac_C$ and $yFrac_C$ are derived as follows:

$$xInt_C = refx_C >> 5 \quad (8\text{-}767)$$

$$yInt_C = refy_C >> 5 \quad (8\text{-}768)$$

$$xFrac_C = refx_C \ \& \ 31 \quad (8\text{-}769)$$

$$yFrac_C = refy_C \ \& \ 31 \quad (8\text{-}770)$$

The prediction sample value predSamplesLX[xC][yC] is derived by invoking the process specified in clause 8.5.6.3.4 with (xIntC, yIntC), (xFracC, yFracC), (xSbIntC, ySbIntC), sbWidth, sbHeight and refPicLX as inputs.

2.3 Scalable Video Coding in VVC

In VVC draft 6, inter-layer reference pictures are introduced to enable spatial and SNR scalabilities.

inter-layer reference picture (ILRP): A picture in the same access unit with the current picture, with nuh_layer_id less than the nuh_layer_id of the current picture, and is marked as "used for long-term reference".

In addition, the following syntaxes are used to support inter layer reference for the current picture.

vps_all_independent_layers_flag equal to 1 specifies that all layers in the CVS are independently coded without using inter-layer prediction. vps_all_independent_layers_flag equal to 0 specifies that one or more of the layers in the CVS may use inter-layer prediction. When not present, the value of vps_all_independent_layers_flag is inferred to be equal to 1. When vps_all_independent_layers_flag is equal to 1, the value of vps_independent_layer_flag[i] is inferred to be equal to 1. When vps_all_independent_layers_flag is equal to 0, the value of vps_independent_layer_flag[0] is inferred to be equal to 1.

vps_layer_id[i] specifies the nuh_layer_id value of the i-th layer. For any two non-negative integer values of m and n, when m is less than n, the value of vps_layer_id[m] shall be less than vps_layer_id[n].

vps_independent_layer_flag[i] equal to 1 specifies that the layer with index i does not use inter-layer prediction. vps_independent_layer_flag[i] equal to 0 specifies that the layer with index i may use inter-layer prediction and vps_layer_dependency_flag[i] is present in VPS.

vps_direct_dependency_flag[i][j] equal to 0 specifies that the layer with index j is not a direct reference layer for the layer with index i. vps_direct_dependency_flag[i][j] equal to 1 specifies that the layer with index j is a direct reference layer for the layer with index i. When vps_direct_dependency_flag[i][j] is not present for i and j in the range of 0 to vpsmax_layers_minus1, inclusive, it is inferred to be equal to 0.

The variable DirectDependentLayerIdx[i][j], specifying the j-th direct dependent layer of the i-th layer, is derived as follows:

```
for( i = 1; i < vps_max_layers_minus1; i− − )
    if( !vps_independent_layer_flag[ i ] )
        for( j = i, k = 0; j >= 0; j− − )
            if( vps_direct_dependency_flag[ i ][ j ] )
                DirectDependentLayerIdx[ i ][ k++ ] = j
```

The variable GeneralLayerIdx[i], specifying the layer index of the layer with nuh_layer_id equal to vps_layer_id[i], is derived as follows:

```
for( i = 0; i <= vps_max_layers_minus1; i++ )
    GeneralLayerIdx[ vps_layer_id[ i ] ] = i
``` ilrp_idc[listIdx][rplsIdx][i] specifies the index, to the list of directly dependent layers, of the ILRP of i-th entry in ref_pic_list_struct(listIdx, rplsIdx) syntax structure to the list of directly dependent layers. The value of ilrp_idc [listIdx][rplsIdx][i] shall be in the range of 0 to the GeneralLayerIdx[nuh_layer_id]−1, inclusive.

The reference picture lists RefPicList[0] and RefPicList[1] are constructed as follows:

If the current picture is a CLVSS picture, all reference pictures currently in the DPB (if any) with the same nuh_layer_id as the current picture are marked as "unused for reference".

Otherwise, the following applies:
  For each LTRP entry in RefPicList[0] or RefPicList[1], when the referred picture is an STRP with the same nuh_layer_id as the current picture, the picture is marked as "used for long-term reference".
  Each reference picture with the same nuh_layer_id as the current picture in the DPB that is not referred to by any entry in RefPicList[0] or RefPicList[1] is marked as "unused for reference".
  For each ILRP entry in RefPicList[0] or RefPicList[1], the referred picture is marked as "used for long-term reference".

```
for( i = 0; i < 2; i++ ) {
  for( j = 0, k = 0, pocBase = PicOrderCntVal; j < num_ref_entries[ i ][ RplsIdx[ i ] ]; j++) {
    if( !inter_layer_ref_pic_flag[ i ][ RplsIdx[ i ] ][ j ] ) {
      if( st_ref_pic_flag[ i ][ RplsIdx[ i ] ][ j ] ) {
        RefPicPocList[ i ][ j ] = pocBase − DeltaPocValSt[ i ][ RplsIdx[ i ] ][ j ]
        if( there is a reference picture picA in the DPB with the same nuh_layer_id as the current
            picture and PicOrderCntVal equal to RefPicPocList[ i ][ j ] )
          RefPicList[ i ][ j ] = picA
        else
          RefPicList[ i ][ j ] = "no reference picture"        (8-5)
        pocBase = RefPicPocList[ i ][ j ]
      } else {
        if( !delta_poc_msb_cycle_lt[ i ][ k ] ) {
          if( there is a reference picA in the DPB with the same nuh_layer_id as the current picture
              and PicOrderCntVal & ( MaxPicOrderCntLsb − 1 ) equal to PocLsbLt[ i ][ k ] )
            RefPicList[ i ][ j ] = picA
          else
            RefPicList[ i ][ j ] = "no reference picture"
          RefPicLtPocList[ i ][ j ] = PocLsbLt[ i ][ k ]
        } else {
          if( there is a reference picA in the DPB with the same nuh_layer_id as the current picture
              and PicOrderCntVal equal to FullPocLt[ i ][ k ] )
            RefPicList[ i ][ j ] = picA
          else
            RefPicList[ i ][ j ] = "no reference picture"
          RefPicLtPocList[ i ][ j ] = FullPocLt[ i ][ k ]
        }
        k++
      }
    } else {
      layerIdx =DirectDependentLayerIdx[GeneralLayerIdx[nuh_layer_id ] ][ ilrp_idc[ i ][ RplsIdx ][ j]]
      refPicLayerId = vps_layer_id[ layerIdx ]
      if( there is a reference picture picA in the DPB with nuh_layer_id equal to refPicLayerId and
          the same PicOrderCntVal as the current picture )
        RefPicList[ i ][ j ] = picA
      else
        RefPicList[ i ][ j ] = "no reference picture"
    }
  }
}
```

A decoded picture in the DPB can be marked as "unused for reference", "used for short-term reference" or "used for long-term reference", but only one among these three at any given moment during the operation of the decoding process. Assigning one of these markings to a picture implicitly removes another of these markings when applicable. When a picture is referred to as being marked as "used for reference", this collectively refers to the picture being marked as "used for short-term reference" or "used for long-term reference" (but not both).

STRPs and ILRPs are identified by their nuh_layer_id and PicOrderCntVal values. LTRPs are identified by their nuh_layer_id values and the Log 2(MaxLtPicOrderCntLsb) LSBs of their PicOrderCntVal values.

After all slices of the current picture have been decoded, the current decoded picture is marked as "used for short-term reference", and each ILRP entry in RefPicList[0] or RefPicList[1] is marked as "used for short-term reference".

2.4 Hypothetical Reference Decoder (HRD)

VVC follows previous standards like HEVC and H.264 to have a concept of hypothetical reference decoder (HRD). HRD is utilized to set contains for bitstreams that do not intrigue overflow or underflow of the hypothetical reference decoder.

3 TECHNICAL PROBLEMS SOLVED BY TECHNICAL SOLUTIONS DISCLOSED HEREIN

1. Screen content coding is sensitive to native resolution. It might happen that when resolution decreases by scaling down the video, bitrate increases significantly. So that adaptive resolution change and scalable video coding may not work well for screen contents.
2. Scalability support in VVC may need certain constrains.
3. There is no need to send QP related information in lossless mode.

4 EXAMPLES OF EMBODIMENTS AND TECHNIQUES

Screen Content Coding Related Issues
1. Whether a picture/video is of native resolution or not may be indicated in the bitstream.
   a. In one example, such an indication may be signalled in DPS/VPS/SPS/PPS/Tile/Slice header.
   b. In one example, such an indication may be signalled in a SEI message.
2. Whether a picture/video is of screen contents may depend on how often certain coding tools are utilized.
   a. In one example, a picture/video may be categorized as screen contents when the number/ratio/area of region of transform skip coding mode surpasses a threshold.
   b. In one example, a picture/video may be categorized as screen contents when the number/ratio/area of region of BDPCM coding mode surpasses a threshold.
   c. In one example, a picture/video may be categorized as screen contents when the number/ratio/area of region of intra block copy coding mode surpasses a threshold.
   d. In one example, a picture/video may be categorized as screen contents when the number/ratio/area of region of palette coding mode surpasses a threshold.
3. Whether a picture/video is of screen contents may depend on a message in DPS/VPS/SPS/PPS/Tile/Slice header.
4. Resolution change may be disallowed for screen contents.
   a. In one example, whether a picture/video is of screen contents may be based on the methods described above.
5. An alternative set interpolation filters may be utilized for screen contents when reference picture and the current picture have different sizes.
   a. In one example, whether a picture/video is of screen contents may be based on the methods described above.
   b. In one example, the filter may be identical to get the nearest integer pixel in the reference picture.
   c. In one example, for each interpolation filter in the alternative filter set, only one entry has non-zero coefficient.
   d. In one example, bilinear interpolation filter may be used.
6. A constrain may be set that when reference picture and the current picture have different sizes, PicOutputWidthL and PicOutputHeightL of the current picture shall be equal to those of the reference picture.
   a. In one example, the conformance window of the reference picture and the conformance window of the current picture may have a same width.
   b. In one example, the conformance window of the reference picture and the conformance window of the current picture may have a same height.

Scalability Related Issues
7. A constraint may be set that a low quality layer cannot be used to predict a high quality layer
   a. In one example, QP in layer i may be disallowed to be larger than QP in layer j if layer j is utilized to predict layer i.
   b. In one example, the maximum allowed QP for a block/TU/PU/CU/CTU/CTB in layer i may be capped by the QP for the corresponding block/TU/PU/CU/CTU/CTB in layer j if layer j is utilized to predict layer i.
   c. In one example, resolution for layer i may be disallowed to be smaller than QP in layer j if layer j is utilized to predict layer i.
   d. In one example, the constrain may be applied for pictures with the same picture order count number, i.e. PicOrderCntVal.
8. A constraint may be set that the conformance window of a low quality layer cannot be larger than the conformance window of a high quality layer.
   a. In one example, it may be disallowed that the width of the conformance window of a lower resolution picture is larger than the width of the conformance window of a higher resolution picture.
   b. In one example, it may be disallowed that the height of the conformance window of a lower resolution picture is larger than the height of the conformance window of a higher resolution picture.
   c. In one example, the constrain may be applied for pictures with the same picture order count number, i.e. PicOrderCntVal.
9. A constraint of maximum number of layers with a same picture order count may be set.
   a. In one example, the allowed number of layers with a same picture order count may be between 1 and a certain number T, inclusive.
   b. The maximum number of layers with a same picture order count may be indicated in DPS/VPS/SPS/PPS/Tile/Slice header.
10. HRD parameters may be based on pictures with a same picture order count.
    a. In one example, HRD parameters may be based on pictures in the decoded picture buffer (DPB) with a same picture order count.
    b. In one example, all pictures with a same picture order count may be considered as a whole picture to derive HRD parameters.
    c. In one example, each layer with a same picture order count may have a specific HRD to derive buffer parameters.

Lossless Coding Related Issues
11. In lossless coding mode, Qp related syntaxes may be skipped.
    a. In one example, the lossless coding mode may be indicated by cu_transquant_bypass_flag.
    b. In one example, the lossless coding mode may be indicated for a region/picture/video by a message in DPS/VPS/SPS/PPS/Tile/Brick/Slice header.
    c. In one example, syntaxs for Qp differences may be skipped.

d. In one example, syntaxs about chroma Qp may be skipped.
12. In lossless coding mode, cbf related syntax may be skipped
   a. In one example, the lossless coding mode may be indicated by cu_transquant_bypass_flag.
   b. In one example, the lossless coding mode may be indicated for a region/picture/video by a message in DPS/VPS/SPS/PPS/Tile/Brick/Slice header.
   c. In one example, syntaxs for luma cbf may be skipped.
   d. In one example, syntaxs for chroma cbf may be skipped.

5 EMBODIMENTS

5.1 Embodiment #1

This embodiment corresponds to bullet 11. Changes are marked in italics.

|  | Descriptor |
|---|---|
| transform_unit( x0, y0, tbWidth, tbHeight, treeType, subTuIndex, chType ) { <br> ... <br> if( ( CbWidthf[ chType ][ x0 ][ y0 ] > 64 ‖ CbHeight[ chType ][ x0 ][ y0 ] > 64 ‖ <br> tu_cbf_luma[ x0 ][ y0 ] ‖ tu_cbf_cb[ x0 ][ y0 ] ‖ tu_cbf_cr[ x0 ][ y0 ] ) && <br> treeType != DUAL_TREE_CHROMA ) { <br> if( cu_qp_delta_enabled_flag && !IsCuQpDeltaCoded && <br> *!cu_transquant_bypass_flag* ) { <br>   cu_qp_delta_abs <br>   if( cu_qp_delta_abs ) <br>     cu_qp_delta_sign_flag <br> } <br> } <br> if( cu_qp_delta_enabled_flag && !IsCuQpDeltaCoded && <br> *!cu_transquant_bypass_flag* ) { <br>   if( cu_chroma_qp_offset_enabled_flag && !IsCuChromaQpOffsetCoded) { <br>   cu_chroma_qp_offset_flag <br>   if( cu_chroma_qp_offset_flag && chroma_qp_offset_list_len_minus1 > 0 ) <br>     cu_chroma_qp_offset_idx <br> } <br> } <br> ... | <br><br><br><br><br><br>ae(v)<br><br>ae(v) |

Figure 5:
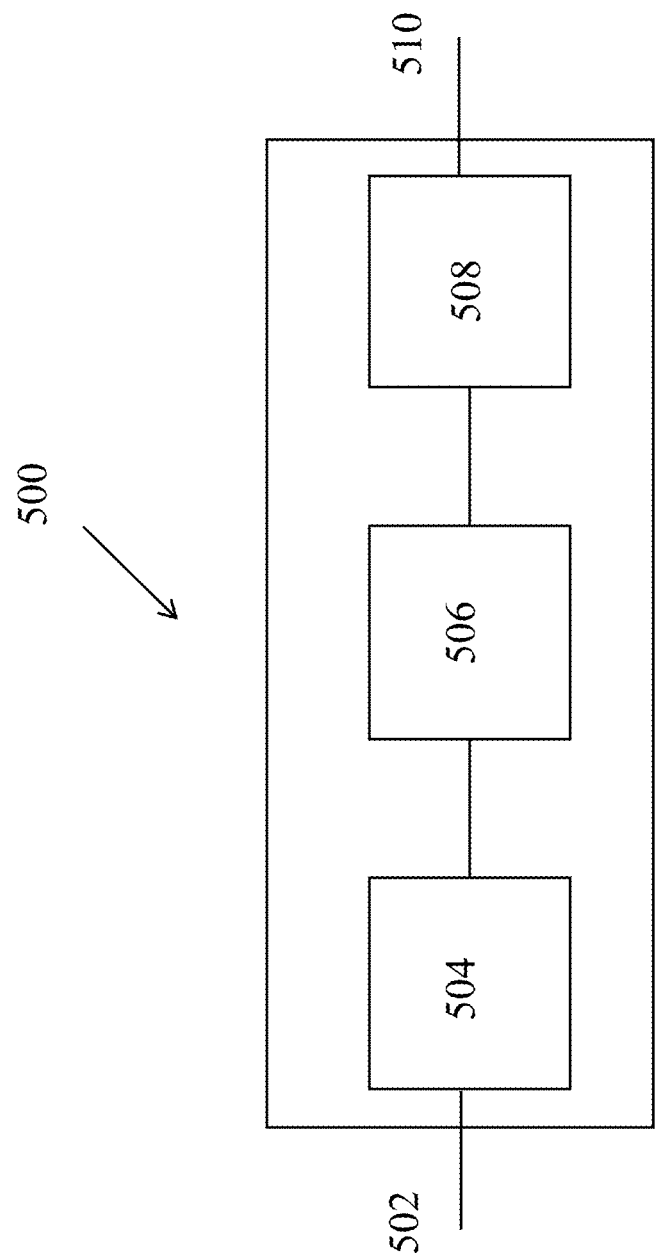
FIG. 5 is a block diagram of an example video processing system in which disclosed techniques may be implemented.

FIG. 5 is a block diagram showing an example video processing system 500 in which various techniques disclosed herein may be implemented. Various implementations may include some or all of the components of the system 500. The system 500 may include input 502 for receiving video content. The video content may be received in a raw or uncompressed format, e.g., 8 or 10 bit multi-component pixel values, or may be in a compressed or encoded format. The input 502 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 500 may include a coding component 504 that may implement the various coding or encoding methods described in the present document. The coding component 504 may reduce the average bitrate of video from the input 502 to the output of the coding component 504 to produce a coded representation of the video. The coding techniques are therefore sometimes called video compression or video transcoding techniques. The output of the coding component 504 may be either stored, or transmitted via a communication connected, as represented by the component 506. The stored or communicated bitstream (or coded) representation of the video received at the input 502 may be used by the component 508 for generating pixel values or displayable video that is sent to a display interface 510. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 6:
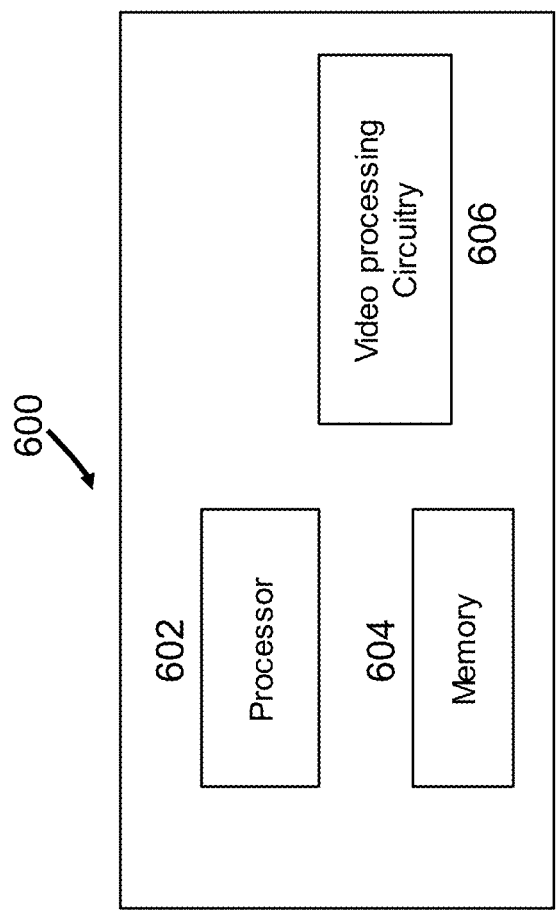
FIG. 6 is a block diagram of an example video processing apparatus.

FIG. 6 is a block diagram of a video processing apparatus 600. The apparatus 600 may be used to implement one or more of the methods described herein. The apparatus 600 may be embodied in a smartphone, tablet, computer, Internet of Things (IoT) receiver, and so on. The apparatus 600 may include one or more processors 602, one or more memories 604 and video processing hardware 606. The processor(s) 602 may be configured to implement one or more methods described in the present document. The memory (memories) 604 may be used for storing data and code used for implementing the methods and techniques described herein. The video processing hardware 606 may be used to implement, in hardware circuitry, some techniques described in the present document.

The following solutions may be implemented as preferred solutions in some embodiments.

The following solutions may be implemented together with additional techniques described in items listed in the previous section (e.g., items 1, 4).

Figure 7:
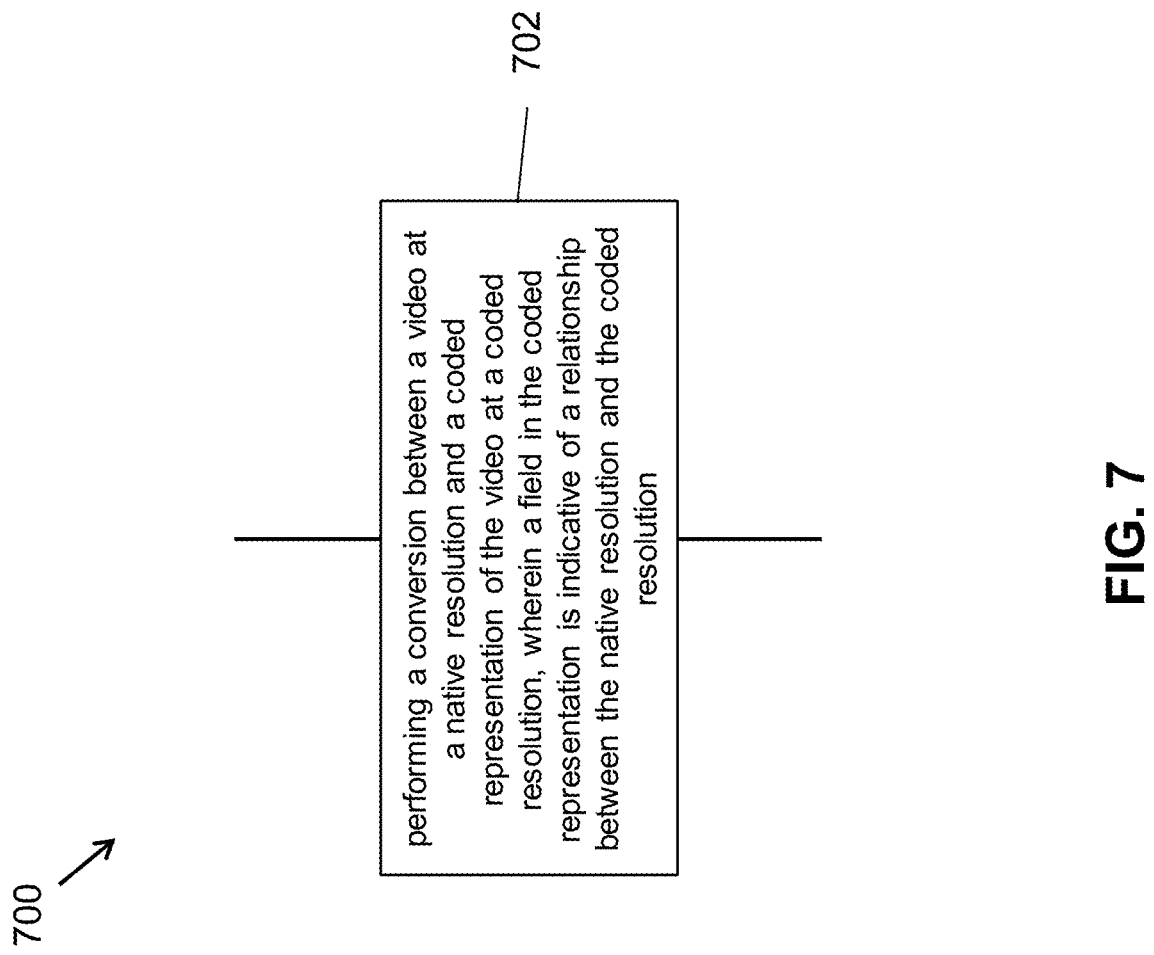
FIG. 7 is a flowchart for an example method of video processing.

1. A method of video processing (e.g., method 700 depicted in FIG. 7), comprising performing (702) a conversion between a video at a native resolution and a coded representation of the video at a coded resolution, wherein a field in the coded representation is indicative of a relationship between the native resolution and the coded resolution.
2. The method of solution 1, wherein the field is included at a video parameter set level or a picture parameter set level or a slice header level or a tile level or a sequence parameter set level.
3. The method of any of solutions 1-2, wherein the field is included with supplemental enhancement information.
4. The method of any of solutions 1-3, wherein the conversion is based on a screen content coding tool dependent on the relationship between the native resolution and the coded resolution.
5. The method of any of solutions 1-4, wherein the coded resolution is equal to the native resolution due to use of screen content coding tool during the conversion.

The following solutions may be implemented together with additional techniques described in items listed in the previous section (e.g., item 2).

6. A method of video processing, comprising determining, for a conversion between a video segment of a video and a coded representation of the video, applicability of screen content coding for the conversion of the video segment based on a usage rule associated with usage of a coding mode for blocks in the video segment; and performing the conversion based on the determining.
7. The method of solution 6, wherein the coding mode is a transform skip coding mode.
8. The method of solution 6, wherein the coding mode is a blurred differential pulse coded modulation coding mode.
9. The method of solution 6, wherein the coding mode is an intra block copy coding mode.
10. The method of solution 6, wherein the coding mode is a palette mode coding mode.
11. The method of any of solutions 6-10, wherein the usage rule is based on a number of occurrences or based on a ratio of blocks coded using the coding mode and blocks coded without using the coding mode or an area of region coded using the coding mode.

The following solutions may be implemented together with additional techniques described in items listed in the previous section (e.g., item 3).

12. The method of any of solutions 1-11, wherein a syntax element in the coded representation indicates that the coded representation uses screen content coding.

The following solutions may be implemented together with additional techniques described in items listed in the previous section (e.g., items 5, 6).

13. A method of video processing, comprising determining, for a conversion between a video unit of a video and a coded representation of the video using a screen content coding tool, a property of the conversion due to a reference picture and a current picture comprising the video unit being of different sizes; and performing the conversion based on the determining.
14. The method of solution 13, wherein the property of the conversion comprises interpolation filters used for scree content interpolation during the conversion.
15. The method of solution 13, wherein the property of the conversion comprises a picture output width or a picture output height associated with the current picture.

The following solutions may be implemented together with additional techniques described in items listed in the previous section (e.g., items 7, 8, 9, 10).

16. A method of video processing, comprising determining, for a conversion between a video unit of a video and a scalable coded representation of the video, a constraint rule used for the conversion; and performing the conversion according to the constraint rule; wherein the scalable coded representation includes a first layer and a second layer wherein the first layer has a quality less than a quality of the second layer.
17. The method of solution 16, wherein the constrain rule disallows prediction of the second layer from the first layer.
18. The method of solution 16, wherein the constrain rule disallows a quantization parameter (QP) in layer i to be larger than a QP in layer j if layer j is utilized to predict layer i.
19. The method of solution 16, wherein the constrain rule specifies that a conformance window of the first layer is not larger than a conformance window of the second layer.
20. The method of solution 16, wherein the constraint rule specifies a maximum number of picture layers used in the coded representation and having a same picture order count.
21. The method of solution 16, wherein the constraint rule specifies to use a hypothetical reference decoder parameter based on pictures with a same picture order count.

The following solutions may be implemented together with additional techniques described in items listed in the previous section (e.g., items 11, 12).

22. A method of video processing, comprising: determining, for a conversion between a video and a coded representation of the video using a lossless coding mode, that the coded representation omits syntax elements related to signaling of quantization parameters or a coded block flag; and performing the conversion based on the determining.
23. The method of solution 22, wherein the coded representation includes an indication of the lossless coding mode as a coding unit level quantization bypass flag.
24. The method of any of solutions 22-23, wherein the lossless coding mode is indicated at a slice or a block or a tile or a picture or a sequence or a video level.
25. The method of any of solutions 1-24, wherein the conversion comprises generating the coded representation from the video region.
26. The method of any of solutions 1-24, wherein the conversion comprises coding the video region to generate the coded representation.
27. A video decoding apparatus comprising a processor configured to implement a method recited in one or more of solutions 1 to 26.
28. A video encoding apparatus comprising a processor configured to implement a method recited in one or more of solutions 1 to 26.
29. A computer program product having computer code stored thereon, the code, when executed by a processor, causes the processor to implement a method recited in any of solutions 1 to 26.
30. A method, apparatus or system described in the present document.

In the above solutions, the performing the conversion includes using the results of previous decision step (e.g., using or not using certain coding or decoding steps) during the encoding or decoding operation to arrive at the conversion results.

Figure 8:
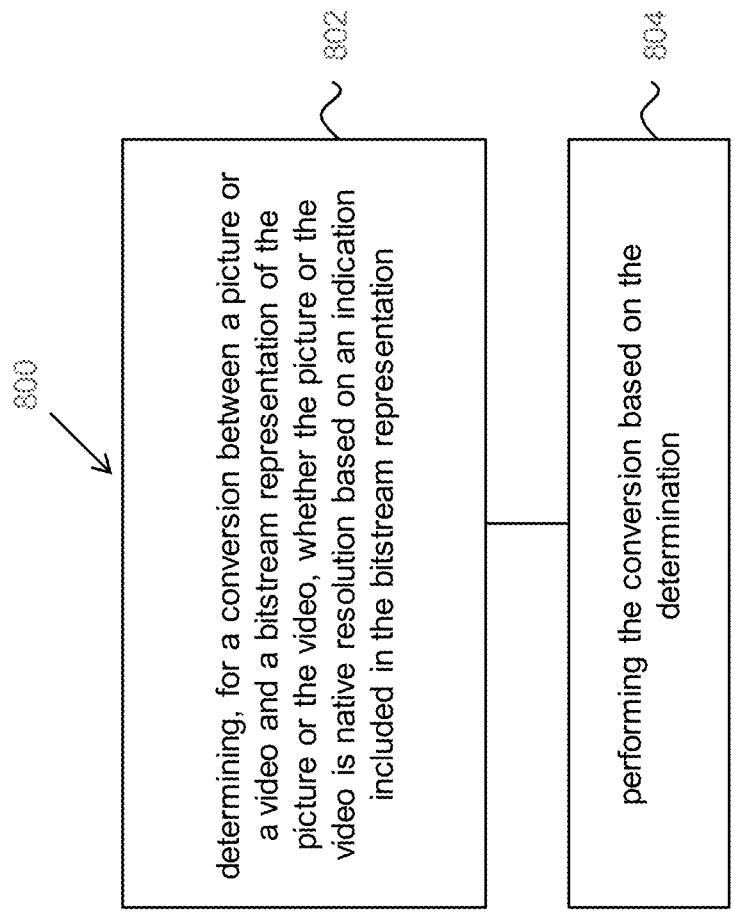
FIG. 8 is a flowchart for an example method of video processing.

FIG. 8 shows a flowchart of an example method for video processing. The method includes determining (802), for a conversion between a picture or a video and a bitstream representation of the picture or the video, whether the picture or the video is native resolution based on an indication included in the bitstream representation; and performing (804) the conversion based on the determination.

In some examples, the indication is signaled in at least one of: a dependency parameter set (DPS), a video parameter set (VPS), a sequence parameter set (SPS), a picture parameter set (PPS), a tile and a slice header.

In some examples, the indication is signaled in a Supplemental Enhancement Information (SEI) message.

Figure 9:
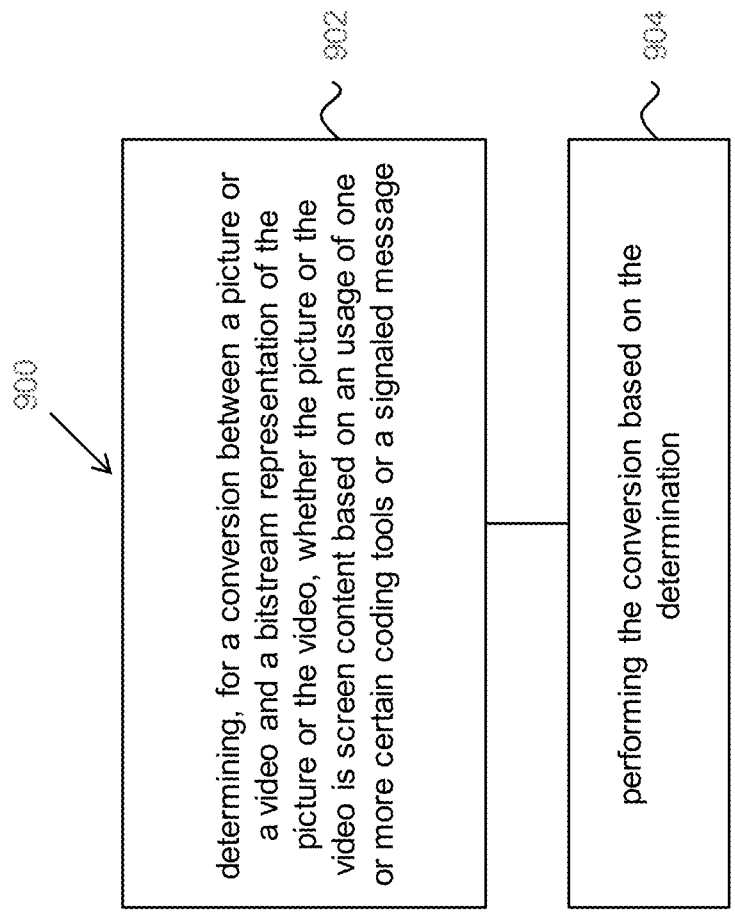
FIG. 9 is a flowchart for an example method of video processing.

FIG. 9 shows a flowchart of an example method for video processing. The method includes determining (902), for a conversion between a picture or a video and a bitstream representation of the picture or the video, whether the picture or the video is screen content based on an usage of one or more certain coding tools or a signaled message; and performing (904) the conversion based on the determination.

In some examples, the certain coding tools include transform skip coding mode, and the picture or the video is determined as screen contents when at least one of number of region, ratio of region and area of region of the transform skip coding mode surpasses a threshold.

In some examples, the certain coding tools include block differential pulse coded modulation (BDPCM) coding mode, and the picture or the video is determined as screen contents when at least one of number of region, ratio of region and area of region of the BDPCM coding mode surpasses a threshold.

In some examples, the certain coding tools include intra block copy coding mode, and the picture or the video is determined as screen contents when at least one of number of region, ratio of region and area of region of the intra block copy coding mode surpasses a threshold.

In some examples, the certain coding tools include palette coding mode, and the picture or the video is determined as screen contents when at least one of number of region, ratio of region and area of region of the palette coding mode surpasses a threshold.

In some examples, the message is signaled in at least one of: a dependency parameter set (DPS), a video parameter set (VPS), a sequence parameter set (SPS), a picture parameter set (PPS), a tile and a slice header.

In some examples, when the picture or the video is determined as the screen contents, resolution change is disallowed.

In some examples, when the picture or the video is determined as the screen contents and when a reference picture and the current picture have different sizes, an alternative set of interpolation filters are applicable to the picture or the video.

In some examples, the filter in the alternative set of interpolation filter is identical to get the nearest integer pixel in the reference picture.

In some examples, for each interpolation filter in the alternative set of interpolation filter, only one entry has non-zero coefficient.

In some examples, the alternative set of interpolation filter includes bilinear interpolation filter.

In some examples, when the current picture or the video is determined as the screen contents and when a reference picture and the current picture have different sizes, one or more constrains are applicable to the picture or the video.

In some examples, the one or more constrains include that a picture output width PicOutputWidthL and/or a picture output height PicOutputHeightL of the current picture are equal to those of the reference picture.

In some examples, the one or more constrains include that a conformance window of the reference picture and a conformance window of the current picture have a same width.

In some examples, the one or more constrains include that a conformance window of the reference picture and a conformance window of the current picture have a same height.

Figure 10:
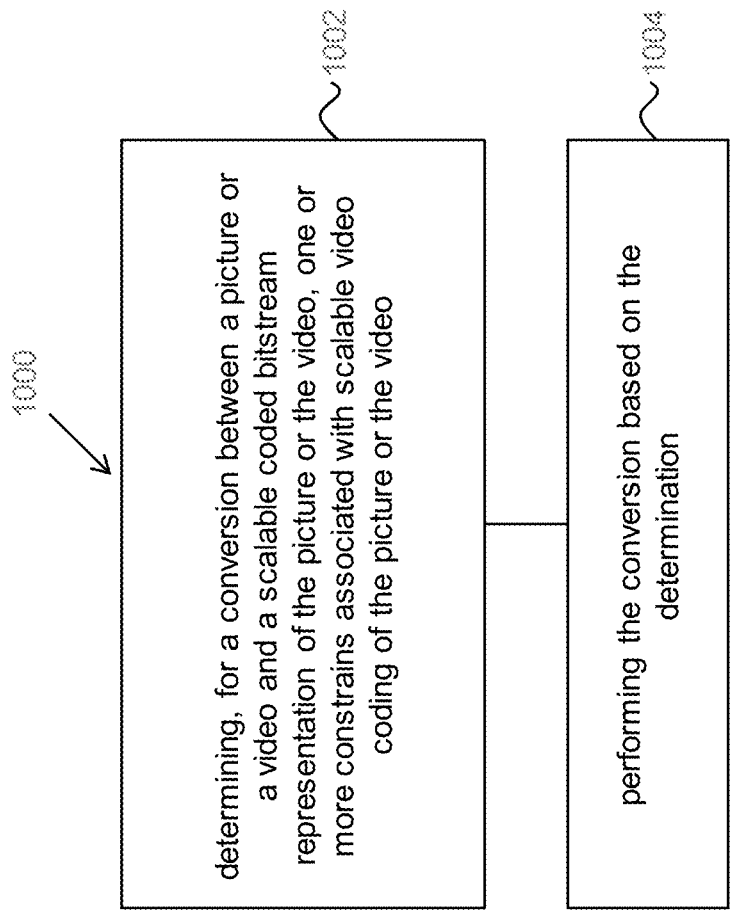
FIG. 10 is a flowchart for an example method of video processing.

FIG. 10 shows a flowchart of an example method for video processing. The method includes determining (802), for a conversion between a picture or a video and a scalable coded bitstream representation of the picture or the video, one or more constrains associated with scalable video coding of the picture or the video; and performing (804) the conversion based on the determination.

In some examples, the scalable coded bitstream representation includes at least a first layer and a second layer, wherein the first layer has a low quality, and the second layer has a high quality.

In some examples, the one or more constrains include that the first layer with low quality cannot be used to predict the second layer with high quality.

In some examples, if the second layer is utilized to predict the first layer, quantization parameter (QP) in the first layer is disallowed to be larger than QP in the second layer.

In some examples, if the second layer is utilized to predict the first layer, the maximum allowed QP for a block, transform unit (TU), prediction unit (PU), coding unit (CU), coding tree unit (CTU) or coding tree block (CTB) in the first layer is capped by the QP for the corresponding block, TU, PU, CU, CTU or CTB in the second layer.

In some examples, if the second layer is utilized to predict the first layer, resolution for the first layer is disallowed to be smaller than resolution in the second layer.

In some examples, the constrains are applied for pictures with the same picture order count number.

In some examples, the one or more constrains include that a conformance window of the first layer with low quality cannot be larger than a conformance window of the second layer with high quality.

In some examples, width of the conformance window of a lower resolution picture is disallowed to be larger than width of the conformance window of a higher resolution picture.

In some examples, height of the conformance window of a lower resolution picture is disallowed to be larger than height of the conformance window of a higher resolution picture.

In some examples, the constrains are applied for pictures with the same picture order count number.

In some examples, the one or more constrains include that maximum number of layers with a same picture order count is setable.

In some examples, the allowed number of layers with a same picture order count is between 1 and a certain number T, inclusive, T being an integer.

In some examples, the maximum number of layers with a same picture order count is indicated in at least one of DPS, VPS, SPS, PPS, Tile and Slice header.

In some examples, hypothetical reference decoder (HRD) parameters are based on pictures with a same picture order count.

In some examples, the HRD parameters are based on pictures in decoded picture buffer (DPB) with a same picture order count.

In some examples, all pictures with a same picture order count are considered as a whole picture to derive the HRD parameters.

In some examples, each layer with a same picture order count has a specific HRD to derive buffer parameters.

Figure 11:
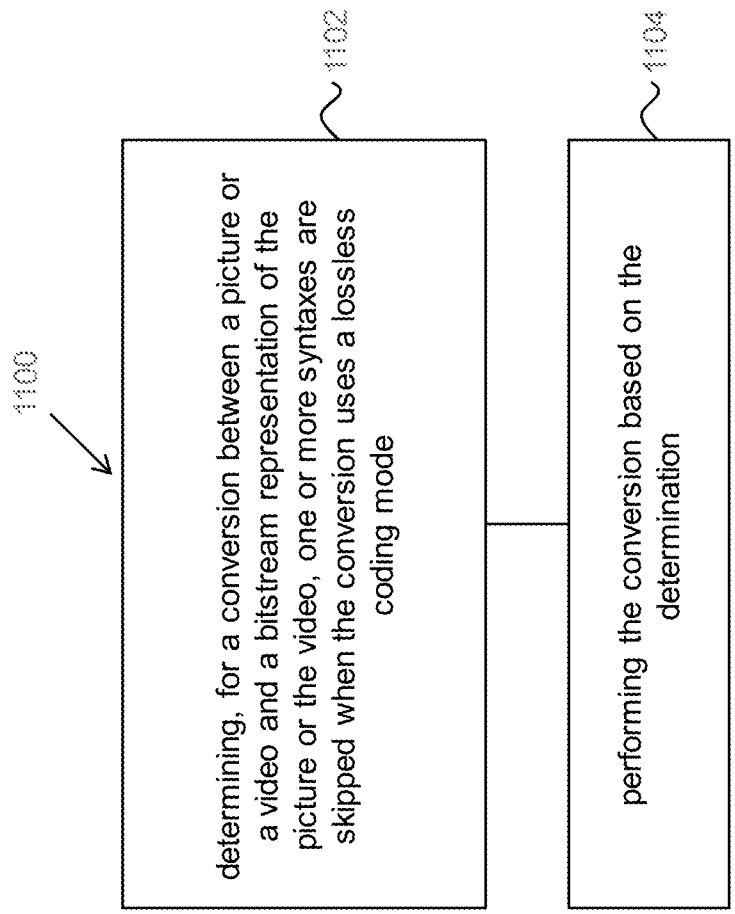
FIG. 11 is a flowchart for an example method of video processing.

FIG. 11 shows a flowchart of an example method for video processing. The method includes determining (1102), for a conversion between a picture or a video and a bitstream representation of the picture or the video, one or more syntaxes are skipped when the conversion uses a lossless coding mode; and performing (1104) the conversion based on the determination.

In some examples, the one or more syntaxes include quantization parameters (QP) related syntaxes.

In some examples, the lossless coding mode is indicated by cu_transquant_bypass_flag.

In some examples, the lossless coding mode is indicated for a region, a picture or a video by a message in at least one of DPS, VPS, SPS, PPS, Tile, Brick and Slice header.

In some examples, the one or more syntaxes include syntaxes for QP differences.

In some examples, the one or more syntaxes include syntaxes about chroma QP.

In some examples, the one or more syntaxes include coding block flag (cbf) related syntax.

In some examples, the lossless coding mode is indicated by cu_transquant_bypass_flag.

In some examples, the lossless coding mode is indicated for a region, a picture or a video by a message in at least one of DPS, VPS, SPS, PPS, Tile, Brick and Slice header.

In some examples, the one or more syntaxes include syntaxes for luma cbf.

In some examples, the one or more syntaxes include syntaxes for chroma cbf.

In some examples, the performing of the conversion includes generating the bitstream representation from the picture or the video.

In some examples, the performing of the conversion includes generating the picture or the video the bitstream representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
   making a determination, for a conversion between a picture or a video and a bitstream of the picture or the video, whether the picture or the video is a screen content based on a usage of one or more certain coding tools or a signaled message; and
   performing the conversion based on the determination,
   wherein the one or more certain coding tools include at least one of a transform skip coding mode, a block differential pulse coded modulation (BDPCM) coding mode, an intra block copy coding mode, or a palette coding mode, and
   wherein the picture or the video is determined as the screen content when at least one of a number of regions coded using the one or more certain coding tools, a ratio of the regions coded using the one or more certain coding tools and regions coded without using the one or more certain coding tools, or an area of the regions coded using the one or more certain coding tools surpasses a threshold.

2. The method of claim 1, wherein the signaled message is signaled in at least one of: a dependency parameter set (DPS), a video parameter set (VPS), a sequence parameter set (SPS), a picture parameter set (PPS), a tile and a slice header.

3. The method of claim 1, wherein, when the picture or the video is determined as the screen content, a resolution change is disallowed.

4. The method of claim 1, wherein, when the picture or the video is determined as the screen content and when a reference picture and a current picture have different sizes, an alternative set of interpolation filters are applicable to the picture or the video.

5. The method of claim 4, wherein a filter in the alternative set of interpolation filters is identical to get a nearest integer pixel in the reference picture.

6. The method of claim 4, wherein for each interpolation filter in the alternative set of interpolation filters, only one entry has a non-zero coefficient.

7. The method of claim 4, wherein the alternative set of interpolation filters includes a bilinear interpolation filter.

8. The method of claim 1, wherein, when the picture or the video is determined as the screen content and when a reference picture and a current picture have different sizes, one or more constrains are applicable to the picture or the video.

9. The method of claim 8, wherein the one or more constrains include that a picture output width PicOutputWidthL and/or a picture output height PicOutputHeightL of a current picture are equal to those of the reference picture.

10. The method of claim 9, wherein the one or more constrains include that a conformance window of the reference picture and a conformance window of the current picture have a same width.

11. The method of claim 9, wherein the one or more constrains include that a conformance window of the reference picture and a conformance window of the current picture have a same height.

12. The method of claim 1, further comprising:
    determining whether the picture or the video is native resolution based on an indication included in the bitstream.

13. The method of claim 1, wherein the performing the conversion includes generating the bitstream from the picture or the video.

14. The method of claim 1, wherein the performing the conversion includes generating the picture or the video the bitstream.

15. An apparatus for processing video data comprising a processor and a non-transitory memory with instructions thereon, wherein the instructions upon execution by the processor, cause the processor to:
    make a determination, for a conversion between a picture or a video and a bitstream of the picture or the video, whether the picture or the video is screen content based on a usage of one or more certain coding tools or a signaled message; and
    perform the conversion based on the determination,
    wherein the one or more certain coding tools include at least one of a transform skip coding mode, a block differential pulse coded modulation (BDPCM) coding mode, an intra block copy coding mode, or a palette coding mode, and
    wherein the picture or the video is determined as the screen content when at least one of a number of regions coded using the one or more certain coding tools, a ratio of the regions coded using the one or more certain coding tools and regions coded without using the one or more certain coding tools, or an area of the regions coded using the one or more certain coding tools surpasses a threshold.

16. A non-transitory computer-readable recording medium storing a bitstream of a video which is generated by a method performed by a video processing apparatus, wherein the method comprises:
    making a determination, for a picture or a video, whether the picture or the video is screen content based on a usage of one or more certain coding tools or a signaled message; and
    generating the bitstream based on the determination,
    wherein the one or more certain coding tools include at least one of a transform skip coding mode, a block differential pulse coded modulation (BDPCM) coding mode, an intra block copy coding mode, or a palette coding mode, and
    wherein the picture or the video is determined as the screen content when at least one of a number of regions coded using the one or more certain coding tools, a ratio of the regions coded using the one or more certain coding tools and regions coded without using the one or more certain coding tools, or an area of the regions coded using the one or more certain coding tools surpasses a threshold.

* * * * *